United States Patent [19]

Schnabel, Jr.

[11] Patent Number: 5,137,561
[45] Date of Patent: Aug. 11, 1992

[54] MECHANISM FOR EXCHANGING CLOTH COVERING ON GLASS SHEET FORMING FIXTURE

[75] Inventor: James P. Schnabel, Jr., Maumee, Ohio

[73] Assignee: Glasstech, Inc., Perrysburg, Ohio

[21] Appl. No.: 619,036

[22] Filed: Nov. 28, 1990

[51] Int. Cl.⁵ .............................................. C03B 23/03
[52] U.S. Cl. ........................................ 65/168; 65/171; 65/172; 65/287; 65/288
[58] Field of Search ................. 65/168, 171, 172, 181, 65/287, 288

[56] References Cited

U.S. PATENT DOCUMENTS

| | | | |
|---|---|---|---|
| 2,370,827 | 3/1945 | Weichbrodt et al. | 65/287 |
| 3,329,494 | 7/1967 | Carson et al. | 65/287 |
| 3,523,783 | 8/1970 | Clark et al. | 65/287 |
| 3,574,590 | 4/1971 | Tank | 65/287 |
| 4,260,409 | 4/1981 | Reese et al. | 65/273 |

*Primary Examiner*—Joye L. Woodard
*Attorney, Agent, or Firm*—Brooks & Kushman

[57] ABSTRACT

A system (10) for changing a cloth covering ring (12) in a glass sheet heating furnace (18) includes an apparatus (26) operable for removing and replacing the cloth ring, a cloth ring changing furnace section (28) that provides access by apparatus (26) into the furnace (18) and a sensor (46) in communication with a controller (50) to sense broken glass and position a shaping mold (16) in position for a cloth ring (12) change.

12 Claims, 3 Drawing Sheets

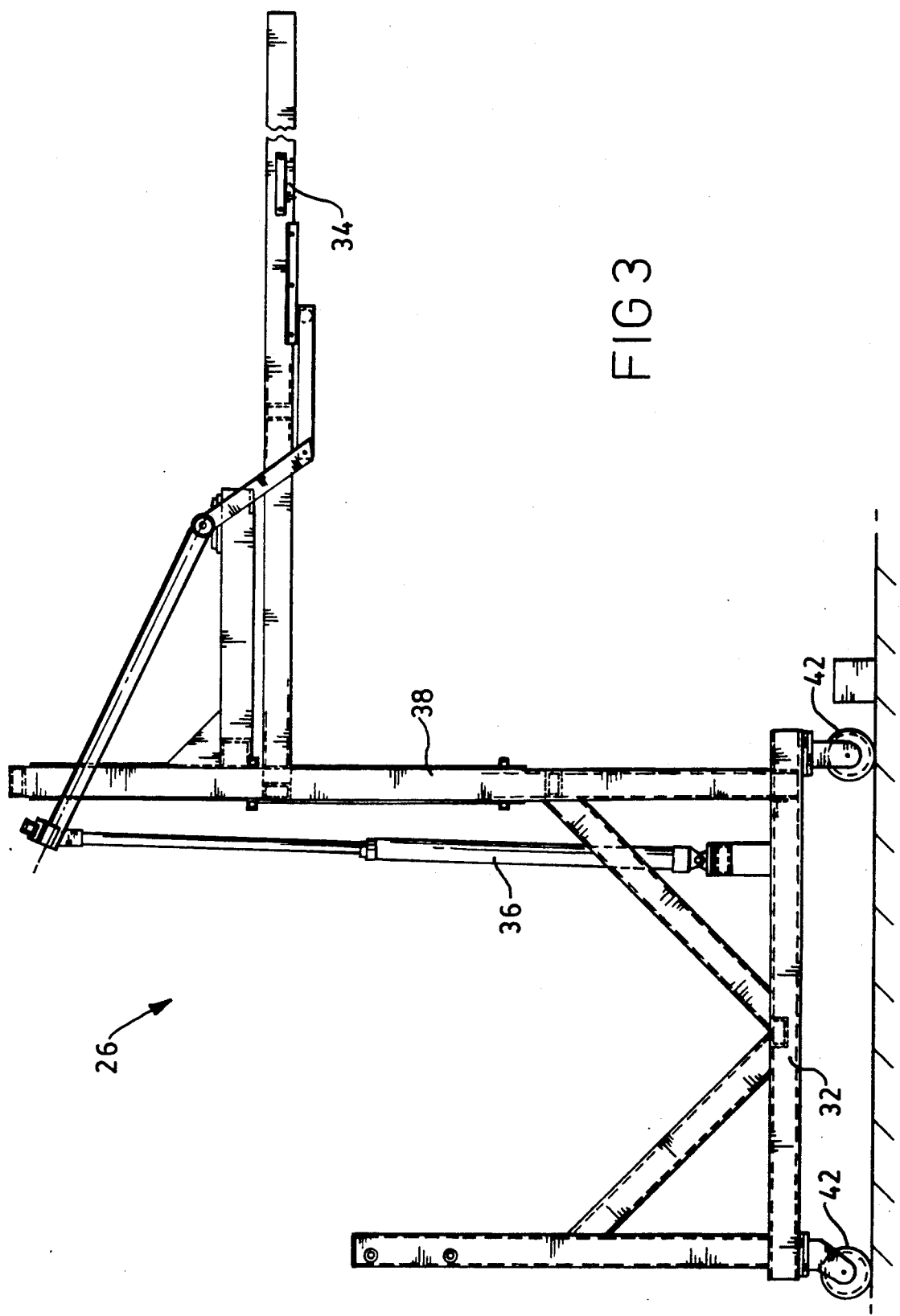

1

MECHANISM FOR EXCHANGING CLOTH COVERING ON GLASS SHEET FORMING FIXTURE

TECHNICAL FIELD

This invention relates to a system for changing a glass sheet contacting cloth mounted on a cloth ring for covering a glass sheet shaping mold and more particularly to a semi-automatic system that greatly reduces cloth ring changing time.

BACKGROUND ART

A conventional glass sheet heating furnace includes a forming section having a glass sheet forming mold mounted on a movable shuttle and a glass sheet contacting cloth mounted on a cloth ring for covering the mold on which a heated glass sheet if formed. The cloth ring is changed when a glass sheet has been broken during the forming so that pieces of the fragmented glass are not imparted into a subsequently formed piece of glass. Changing the cloth ring requires attaching a frame to an annealing ring, opening a shuttle door in the furnace end wall, driving the shuttle to the end wall of the furnace, prying the cloth ring off using the annealing ring as a fulcrum, removing the cloth ring, driving the shuttle out of the furnace, replacing the cloth ring and reversing the procedure to install the new cloth ring.

This method of changing a cloth ring requires a visual determination that a glass sheet has broken and requires a significant number of steps to change the cloth ring.

SUMMARY OF THE INVENTION

An object of the present invention is to provide a system for changing a glass sheet contacting cloth mounted on a cloth ring for covering a glass sheet shaping mold in significantly less time than with conventional systems.

Another object of the invention is to provide a system for changing a cloth ring that minimizes heat loss during the cloth ring change.

A further object of the invention is to provide a system that accurately senses the absence of a glass sheet on tooling and automatically positions the shaping mold for a cloth ring change.

In carrying out the above objects and other objects of the invention, the system is disclosed for changing a cloth ring including a glass sheet contacting cloth for covering a glass sheet shaping mold in a glass sheet heating furnace. The glass sheet heating furnace having a forming section and a sag section. The glass sheet shaping mold is movable between the sag and forming sections. Such a system comprises an apparatus operable for removing and replacing the cloth ring on the shaping mold and also a cloth ring changing furnace section including an upper door located between the forming and sag sections that provides access by the apparatus to the cloth covering ring and forming mold, and minimizes heat loss during a cloth covering ring change.

The apparatus includes a base portion, a lifting portion movably mounted to the base and being engagable with the cloth ring, and an actuator for effecting movement of the lifting portion to remove the cloth ring from the shaping mold and for subsequently placing another cloth ring on the shaping mold. Preferably, the lifting portion is defined by a pair of lifting arms movably mounted to the support structure and so contained such that there is no horizontal displacement of the arms as they are raised or lowered by a pneumatic actuator.

Preferably, the system includes a guide defined by a track for guiding the apparatus into its operable position adjacent the cloth ring changing furnace section.

A sensor detects the absence of a glass sheet on a glass sheet forming tool located after the shaping mold. This glass sheet forming tool is the one onto which the glass sheet is to be transferred from the shaping mold. The system further includes a controller in communication with the sensor for positioning the shaping mold at the cloth changing furnace section if the absence of glass is detected so that the cloth covering ring can be easily changed.

Most preferably, the sensor is a vacuum sensor which senses a smaller vacuum level in connection with the absence of a glass sheet than if the glass sheet were covering the glass sheet forming tool.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is an enlarged elevational view of the cloth ring changing apparatus of FIG. 1.

BEST MODE FOR CARRYING OUT THE INVENTION

Figure 1:
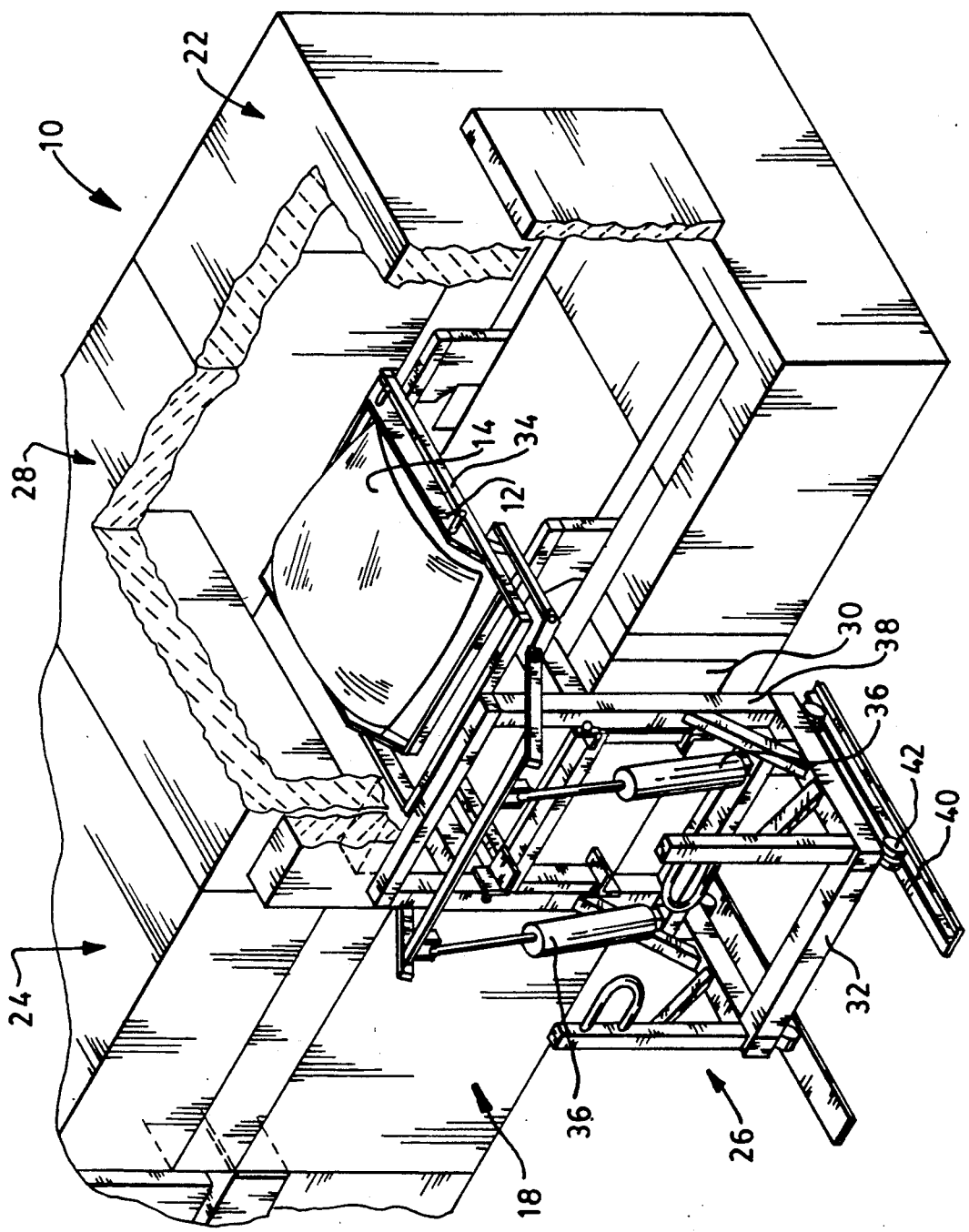
FIG. 1 is a cut-away perspective view of a glass sheet heating furnace having sag and form sections illustrating a cloth ring changing furnace section therebetween and a cloth ring changing apparatus constructed in accordance with the present invention.

Referring to FIG. 1 of the drawings, a system for changing a cloth ring 12 including a glass sheet contacting cloth 14 for covering a glass sheet shaping mold 16 is generally indicated by reference numeral 10 and is used in the glass sheet heating furnace 18. As is hereinafter more fully described, the system 10 is semi-automatic and reduces the down-time associated with glass sheet cloth ring changes.

Figure 2:
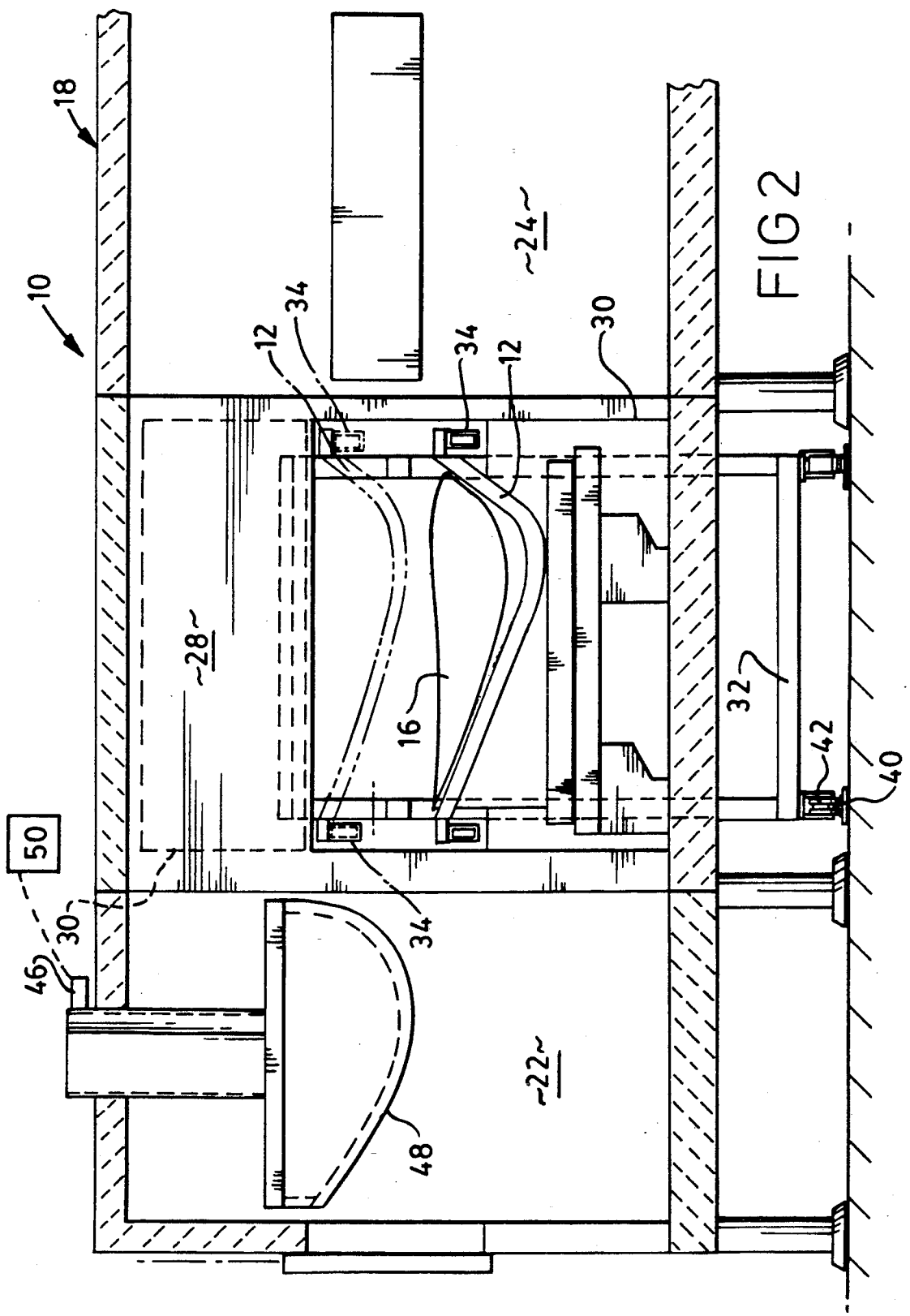
FIG. 2 is a sectional elevational view of the sag, forming and cloth ring changing furnace sections of FIG. 1.

As shown in FIGS. 1 and 2, the glass sheet heating furnace 18 has a forming section 22 and a sag section 24. The glass sheet shaping mold 16 is movable between the sag and forming sections 22,24. The system 10 comprises an apparatus 26 operable for removing and replacing the cloth ring 12 on the shaping mold 16. A cloth ring changing furnace section 28 including an upper side door 30 is located between the forming and sag sections 22,24 and provides access by the apparatus 26 to the cloth ring 12 and forming mold 16 to facilitate a cloth ring change and minimize heat loss during a cloth ring change.

With reference to FIGS. 1 and 3 of the drawings, the apparatus 26 includes a base portion 32 and a lifting portion 34 movably mounted to the base. The lifting portion 34 is engagable with the cloth ring 12. An actuator 36 moves the lifting portion 34 between raised and lowered positions whereby the cloth ring 12 can be removed from the shaping mold 16 and subsequently another cloth covering ring can be placed on the shaping mold. With further reference to FIG. 3, base portion 32 defines a cart including a vertically extending support structure 38. Lifting portion 34 is defined by lifting arms mounted by the support structure 38. The lifting arms 34 are contained such that there is no horizontal displacement of the arms when the arms are raised or lowered.

In the preferred embodiment of the invention, actuator 36 is a pneumatically operated mechanical linkage assembly; although other types of actuators are contemplated.

With reference again to FIG. 1 of the drawings, system 10 further includes a guide 40 defined by a track of an inverted V shape for guiding the apparatus 26 into its operable position at the cloth ring changing furnace section 28. Apparatus 26 includes a follower 42 defined by wheels having a peripheral V-groove for following the track 40.

With further reference to FIG. 2 of the drawings, the cloth ring changing furnace section 28 includes two doors 30 on each side of the furnace section to allow the furnace section to also be used for various tool changes and for easy access into the furnace 18.

System 10 further includes a sensor 46 for detecting the absence of a glass sheet on a glass sheet forming tool 48, shown in FIG. 2 as a vacuum-type enclosed press ring, located in the forming station for forming the glass sheet by pressing engagement with the shaping mold 16 and thereafter supporting the formed glass sheet with negative pressure. Preferably sensor 46 is a vacuum sensor. A controller 50 in communication with the sensor 46 commands the shaping mold 16, through the regular furnace controls, to the cloth changing furnace section 28 if the absence of a glass sheet is detected on the forming tool 48. If this occurs, the upper furnace door 30 is opened and the apparatus 26 is moved by an operator along guides 40 in a transverse direction to the furnace 10 to position the arms 34 beneath the cloth ring 12 and then the cloth covering ring is raised vertically off the mold 16.

Apparatus 26 is then moved laterally with respect to the furnace 18 away from the furnace. Manually, the used cloth ring 12 is discarded and a new cloth covering ring is placed on the arms 34. The apparatus 26 is again moved laterally with respect to the furnace 18 to position the cloth ring 12 above the mold 16 and the arms 34 are lowered by actuator 36 to place the new cloth ring 12 on the shaping mold. Then, the apparatus 26 is again moved laterally with respect to the furnace 18, away from the furnace, and the upper door 30 is shut to resume a production operation.

While the best mode for carrying out the invention has been described in detail, those familiar with the art to which this invention relates will recognize various alternative designs and embodiments for practicing the invention as defined by the following claims.

What is claimed is:

1. In a glass sheet bending apparatus including a furnace having a forming section and a sag section, a glass sheet shaping mold movable between the sag and forming sections, and a cloth ring disposed about the shaping mold, a system for changing the cloth ring comprising:
   first means for removing and replacing the cloth ring about the shaping mold;
   a cloth ring changing furnace section including an upper side door located between the forming and sag sections; and
   second means for horizontal movement of said first means to and from an operable position in the cloth ring changing furnace section.

2. A system as in claim 1 wherein said first means comprises a base portion; a lifting portion movably mounted to said base portion; said lifting portion being engagable with the cloth ring; and an actuator effecting movement of said lifting portion whereby the cloth covering ring can be removed from about the shaping mold via said lifting portion when said first means is in the operable position, moving the first means via said second means to an inoperable position by replacing the cloth ring on said lifting portion, moving the first means via said second means back to the operable position and disposing the replacement cloth ring about the shaping mold.

3. A system as in claim 2 wherein said base portion comprises a cart including a vertically extending support structure.

4. A system as in claim 3 wherein said lifting portion is defined by lifting arms mounted to said support structure, said lifting arms being constrained such that there is not horizontal displacement of said arms when the said arms are raised or lowered.

5. A system as in claim 4 wherein said actuator is a pneumatically operated mechanical linkage assembly.

6. A system as in claim 5 wherein said second means includes guide means for guiding said first means into its operable position.

7. A system as in claim 6 wherein said guide means comprises a track.

8. A system as in claim 7 wherein said second means also includes a follower means for following said track.

9. A system as in claim 1 wherein said cloth ring changing furnace section includes two doors on each side of said section to allow said cloth ring changing furnace section to be used for shaping mold changes.

10. A system as in claim 1 wherein said forming station includes an upper forming tool comprising a vacuum-type enclosed press ring for forming the glass sheet by pressing engagement with the shaping mold and thereafter supporting the formed glass sheet with negative pressure, and also a sensor for detecting the absence of a formed glass sheet after the forming on said press ring thereby indicating that the glass sheet didn't transfer onto the press ring.

11. A system as in claim 10 further including a controller in communication with said sensor for commanding said shaping mold to said cloth changing furnace section if the absence of a glass sheet is detected.

12. A system as in claim 10 wherein said sensor is a vacuum sensor for sensing vacuum levels within the enclosed press ring.

* * * * *